(12) United States Patent
Mohamadi (10) Patent No.: US 9,547,019 B2
(45) Date of Patent: Jan. 17, 2017

(54) MEMS TUNNELING MICRO SEISMIC SENSOR

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 380 days.

(21) Appl. No.: 14/151,487

(22) Filed: Jan. 9, 2014

(65) Prior Publication Data

US 2014/0190259 A1 Jul. 10, 2014

Related U.S. Application Data

(60) Provisional application No. 61/750,623, filed on Jan. 9, 2013.

(51) Int. Cl.
*G01P 15/08* (2006.01)
*G01P 15/03* (2006.01)

(52) U.S. Cl.
CPC ............. *G01P 15/032* (2013.01); *G01P 15/08* (2013.01); *G01P 15/0802* (2013.01); *G01P 15/0894* (2013.01)

(58) Field of Classification Search
CPC ... G01P 15/0802; G01P 15/0894; G01P 15/18; G01P 15/08
USPC .............. 73/514.16, 514.18, 514.24, 514.38, 73/514.02
See application file for complete search history.

(56) References Cited

U.S. PATENT DOCUMENTS

| | | | |
|---|---|---|---|
| 5,431,051 A * | 7/1995 | Biebl | G01P 15/0894 73/514.36 |
| 7,094,622 B1 * | 8/2006 | Cui | B81C 99/0085 438/57 |
| 8,347,720 B2 | 1/2013 | De Los Santos et al. | |
| 8,656,778 B2 * | 2/2014 | Guo | G01P 15/125 73/514.32 |
| 2004/0118207 A1 * | 6/2004 | Niendorf | G01P 15/0888 73/514.16 |
| 2011/0314913 A1 * | 12/2011 | De Los Santos | G01P 15/0802 73/514.24 |

* cited by examiner

Primary Examiner — Helen Kwok
(74) *Attorney, Agent, or Firm* — Haynes and Boone, LLP (57) ABSTRACT

A tunneling accelerometer that can be implemented as a MEMS micro sensor provides differential sensing that minimizes large forces resulting from undesired environmental effects. Used as a seismic sensor, for example, the accelerometer exhibits maximum sensitivity for small seismic waves and suppresses very large seismic activities occurring at shallower depths. In one embodiment, detected current decreases from its maximum for stronger forces and is maximized for small vibrations. In another embodiment, separation of columns of top and bottom tunneling tip pairs, one column from the next, increases gradually so that the tunneling accelerometer suppresses sensitivity to large accelerations such as large seismic activity. A manufacturing process for the accelerometer provides reduced complexity for better yield.

13 Claims, 8 Drawing Sheets

P++layer/Silicide
N+layer
Si wafer

Form Bottom Tips

FIG. 6B

Fine Separation Layer

Pattern Anchor & Fill with Oxide

FIG. 6D

Pattern for Top Tips & Form Proof-mass

FIG. 6E

Deposit Metal to Form Top Layer Tips Passivation Layer

FIG. 6F

Remove Sacrificial Layers & Seal

FIG. 6G

MEMS TUNNELING MICRO SEISMIC SENSOR

CROSS REFERENCE TO RELATED APPLICATIONS

This application claims the benefit of priority from U.S. Provisional Patent Application No. 61/750,623, filed Jan. 9, 2013, which is incorporated by reference.

BACKGROUND

The present invention relates generally to accelerometers and, more particularly, to a MEMS-based micro sensor implementation for a tunneling accelerometer with differential sensing useful for seismic activity monitoring.

There is a great interest in monitoring seismic activity of fractured wells in the oil and gas industry. Oil and gas wells typically range in depth from about 2,000 ft. to 20,000 ft. Shallow wells, typically less than 7,000 ft. in depth, generally can be monitored with geophones. Current state of the art geophones are deficient, however, mostly at greater depths due to a need for greater sensor sensitivity for sensing activity in deep wells that is swamped by large seismic activity at shallower depths. As a result, seismic monitoring is needed that is designed to suppress very large seismic activities at the surface and shallow depths such that maximum sensitivity can be obtained for small signals propagated from deep seismic activities.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Methods and systems are disclosed to address the need for accelerometers with greater sensor sensitivity for sensing small accelerations that may be swamped by large accelerations resulting from events of lesser interest. One or more embodiments thus address a need for suppressing detection of very large accelerations such that maximum sensitivity can be obtained for small signals propagated from events of greater interest. Methods are also disclosed that address a need for manufacturing micro-electromechanical systems (MEMS) tunneling accelerometers and reduce the complexity of the manufacturing process for better yields of the particular implementations.

Embodiments may, thus, provide seismic monitoring designed to suppress very large seismic activities at the surface and shallow depths such that maximum sensitivity can be obtained for small signals propagated from deep seismic activities. As a result, seismic monitoring may be achieved that has greater sensor sensitivity for sensing activity in deep oil and gas wells that would otherwise be swamped by large seismic activity at shallower depths.

Various embodiments may incorporate teachings from U.S. Pat. No. 8,347,720 issued Jan. 8, 2013, entitled "MEMS Tunneling Accelerometer", which is incorporated by reference.

Figure 1A:
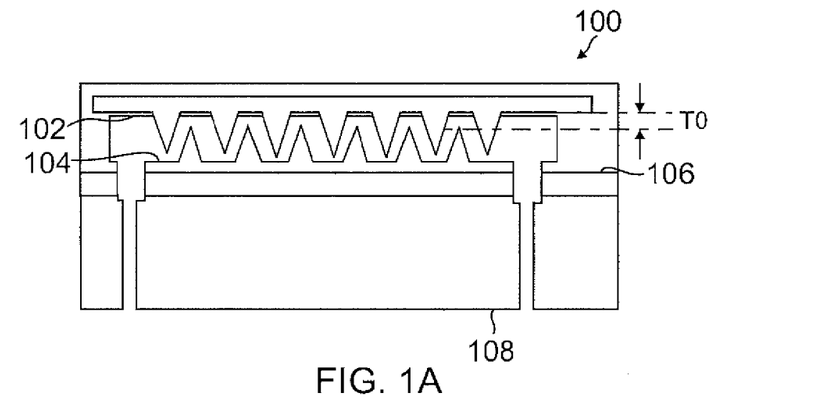
FIG. 1A is a cross sectional diagram and FIG. 1B is a plan view diagram of a micro-electromechanical systems (MEMS) tunneling accelerometer, in accordance with an embodiment of the invention.
Figure 1B:
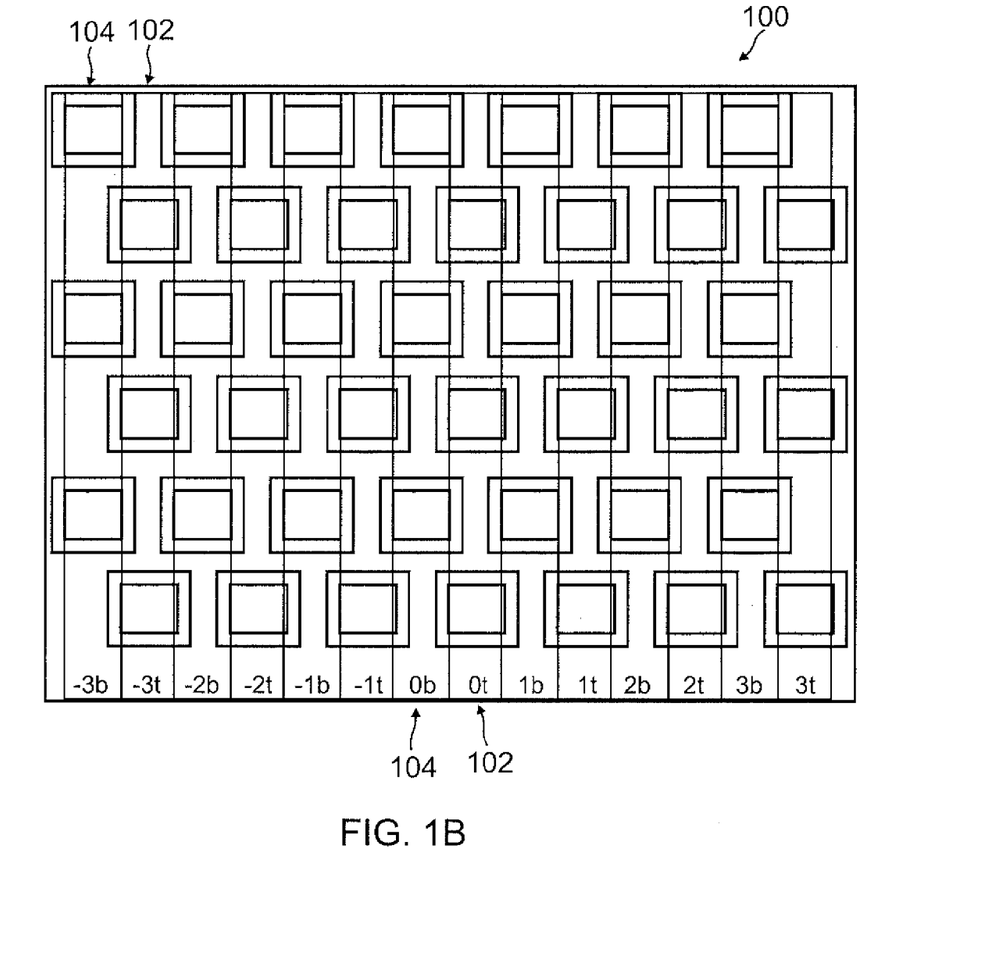

FIG. 1A and FIG. 1B illustrate MEMS tunneling accelerometer 100, in accordance with an embodiment of the invention. Accelerometer 100 may include a top layer 102 of tunneling tips and plates, which may comprise silicide or metal such as aluminum, and a bottom layer 104 of tunneling tips and plates, which may comprise a P++ doped silicon or silicide. Top layer 102 of tunneling tips and plates and bottom layer 104 of tunneling tips and plates may be separated by a tunneling gap TO of appropriate dimension such that a tunneling current flows between the tunneling tips and the tunneling plates when the tunneling tips of each layer are appropriately biased relative to the tunneling plates of the other layer.

Accelerometer 100 may include an anchor 106 for the top layer 102 of tunneling tips and plates and a proof mass 108 connected to the bottom layer 104 of tunneling tips and plates. As seen in FIG. 1B, top layer 102 of tunneling tips and plates and bottom layer 104 of tunneling tips and plates may be arranged so that the top layer 102 of tunneling tips and plates form a first array with the tunneling tips and plates arranged as columns and the tunneling tips spaced along each column and arranged in rows; and likewise, the bottom layer 104 of tunneling tips and plates form a second array with the tunneling tips and plates arranged as columns and the tunneling tips spaced along each column and arranged in rows.

As seen in FIG. 1B, the columns the bottom layer 104 are labeled 0b, 1b, −1b, etc., and the columns of the top layer 102 are labeled 0t, 1t, −1t, etc., so that each array column of tunneling tips and plates may be associated with a corresponding (or adjacent or overlapping) column of tips and plates from the other (respectively top or bottom) layer.

As seen in FIGS. 1A and 1B, proof mass 108 may be connected to the bottom layer 104 of tunneling tips and plates and configured to allow displacement of the proof mass 108 laterally relative to the anchor 106 in a plane (e.g., horizontal in FIG. 1A) defined by the top 102 and bottom 104 layers in response to applied accelerations so that there is a corresponding lateral displacement between the tunneling tips of the bottom layer 104 and the plates of the top layer 102 as well as the plates of the bottom layer 104 and the tunneling tips of the top layer 102. Also as seen in FIG. 1B, the top and bottom tunneling tips are arranged in rows that are spaced apart so that they can be displaced past each other laterally under large relative displacements between the top 102 and bottom 104 layers.

Figure 2A:
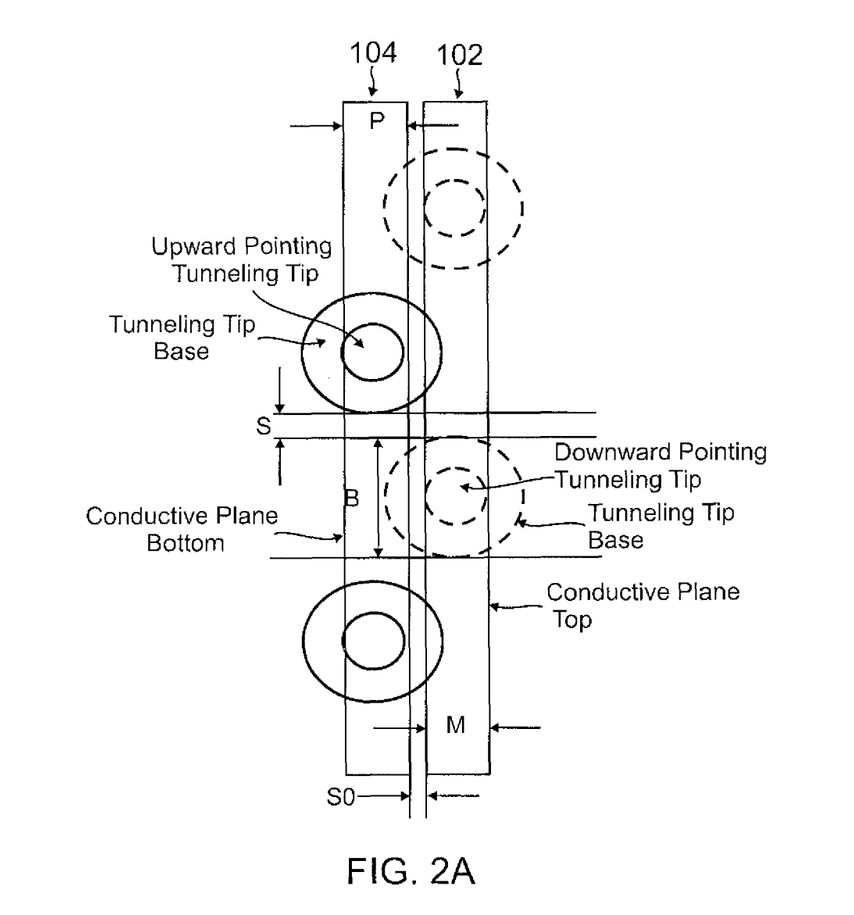
FIGS. 2A and 2B are plan view diagrams showing a portion of a MEMS tunneling accelerometer in accordance with alternative embodiments.
Figure 2B:
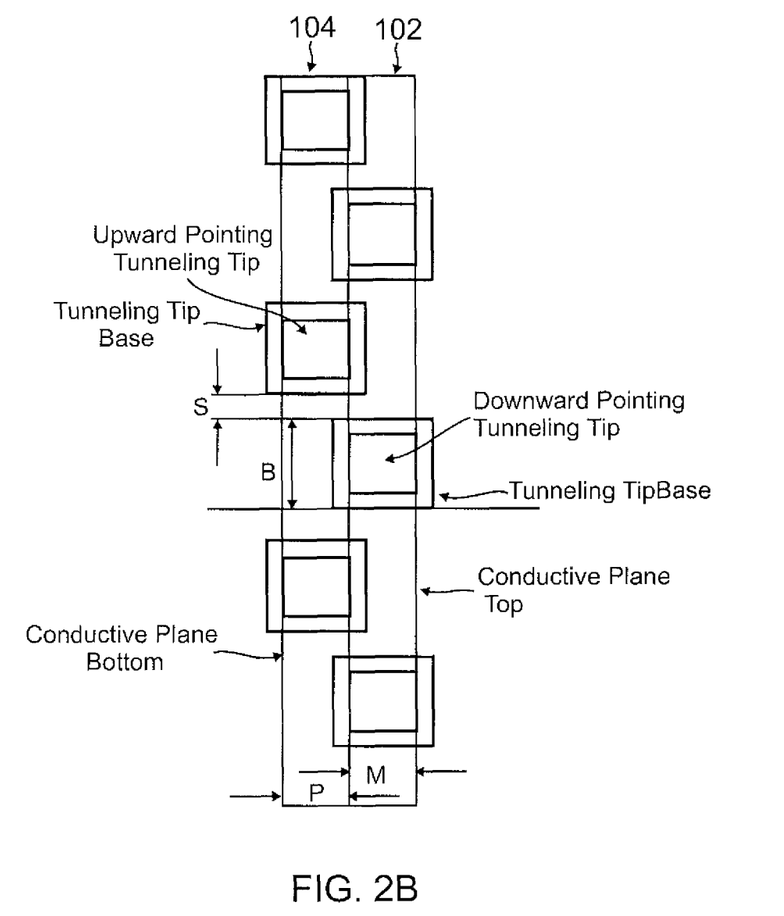

FIGS. 2A and 2B each show a portion of a MEMS tunneling accelerometer 100 in accordance with alternative embodiments. FIG. 2A shows top and bottom tips arrangement for conical shaped tunneling tips, and FIG. 2B shows top and bottom tips arrangement for pyramid shaped tunneling tips. As shown in FIG. 2A, bottom layer 104 of tunneling tips and plates may comprise P++ routed tips that are formed in the bottom plates, and top layer 102 of tunneling tips and plates may comprise metal tips that are deposited and connected in a later manufacturing step.

As seen in both FIG. 2A and FIG. 2B, dimension M=Metal width for the top layer 102 tunneling plates; dimension P=P++ junction width for the bottom layer 104 tunneling plates; dimension B=tunneling tip base diameter (for conical shaped tips) or base side (for pyramid shaped tips); dimension S=top and bottom tunneling tip separation horizontally (allowing lateral displacement of top and bottom tips past each other). As shown in FIG. 2A, dimension S0=separation of metal (e.g., top layer 102) and P++ (e.g., bottom layer 104) layer horizontally (i.e., lateral separation). Dimension S0 is for conditions of equilibrium, e.g., absence of any vibration or accelerations applied to the accelerometer 100, so that the tunneling tips of the bottom layer 104 align with the plates of the top layer 102 and the tunneling plates of the bottom layer 104 align with the tunneling tips of the top layer 102 as shown, e.g., little or minimal overlap of tunneling tips with opposing plates of the other layer. For the example of alignment shown in FIG. 2A, there is no current injection at equilibrium.

FIG. 2B shows an alternative arrangement that can be made to integrate more tunneling tips, hence, more tunneling injected current for a similar area. FIG. 2B illustrates pyramid shaped tips and a highly integrated pattern formed using pyramid shaped tips. For the example arrangement and alignment shown in FIG. 2B, dimension S0—the separation of metal (e.g., top layer 102) and P++ (e.g., bottom layer 104) layer horizontally (i.e., lateral separation)—is equal to zero in this arrangement for no current injection at equilibrium, e.g., absence of any vibration or applied acceleration to accelerometer 100. Using the highly integrated pattern additional strips (e.g. pair of bottom and top layer columns) may be fitted in the same space, increasing current density as injection current of all tips can be accumulated for better sensitivity, as seen, for example, in FIG. 1B. The arrangement also has the advantage of producing a differential signal to be detected from the P++ (e.g., bottom layer 104) and metal (e.g., top layer 102) connectors, as further described below.

Figure 3:
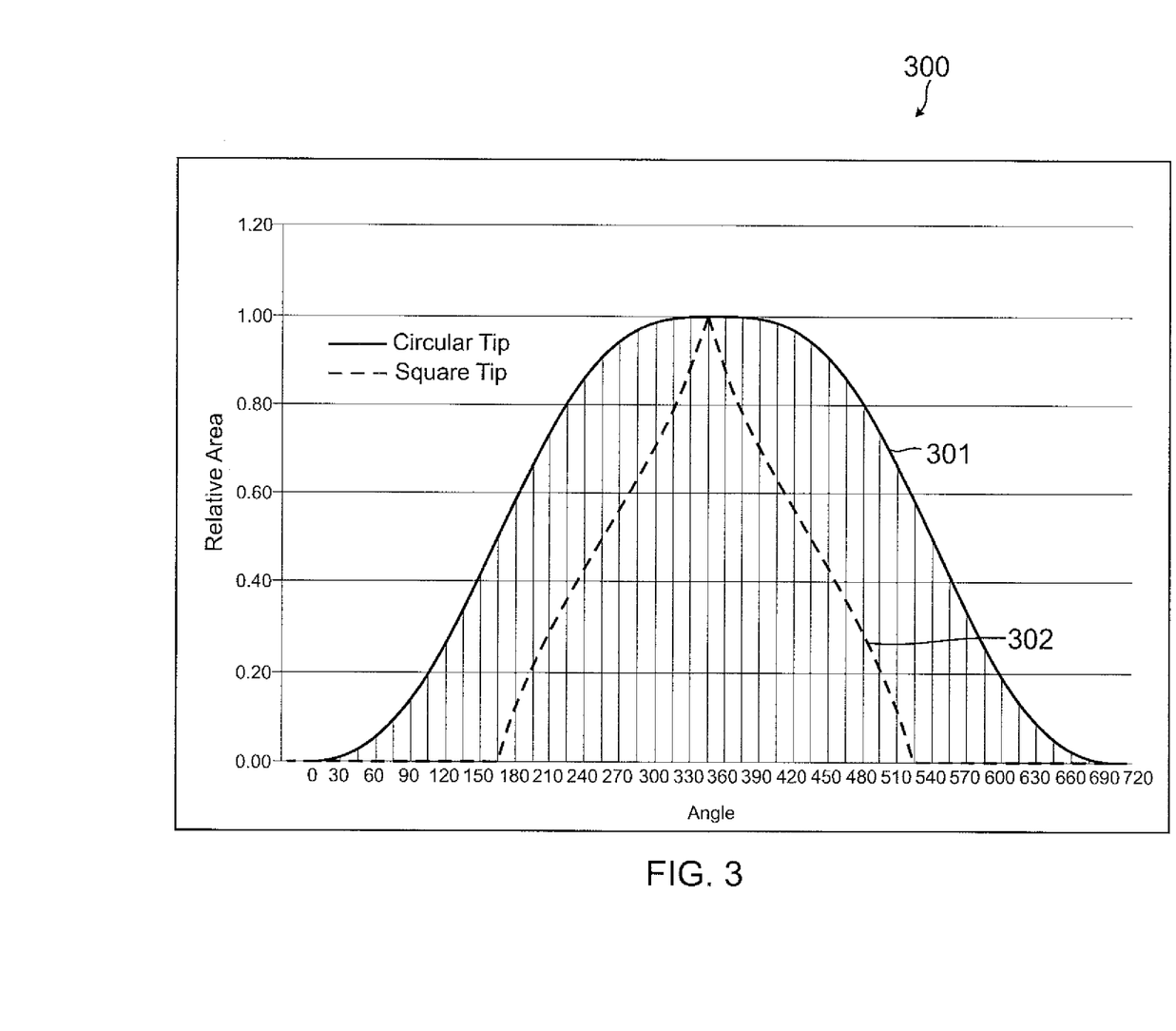
FIG. 3 is a graph of relative overlap area vs. misalignment between top side tips and bottom plates of a MEMS tunneling accelerometer, in accordance with an embodiment.

FIG. 3 is a graph 300 illustrating tunneling tip's effective area as a function of relative overlap area vs. misalignment between top layer 102 tunneling tips and bottom layer 104 tunneling plates of a MEMS tunneling accelerometer 100, in accordance with an embodiment. Relative area, shown on the ordinate of graph 300, provides a measure of relative overlap of displaced top 102 and bottom 104 layers ranging from no (minimum) overlap, 0.00, to complete (maximum) overlap, 1.00, of top and bottom column pairs (e.g. a pair such as 0b, 0t as labeled in FIG. 1B). Angle shown on the abscissa of graph 300, refers to misalignment angle between top layer tips and bottom layer plates. For example, a complete pitch overlap (minimum to maximum to minimum) may be about two metal pitch widths (e.g. dimension M shown in FIG. 2B), which may be translated to 2×360° angle shift in space. Curves 301 and 302 illustrate the effective area of the metal (e.g., top layer 102) to P++ (e.g., bottom layer 104) area overlap for circular conical tips (curve 301) with relative radius or diameter (e.g., dimension B in FIG. 2A) of 1 unit and square pyramidal tips (curve 302) with relative side (e.g., dimension B in FIG. 2B) of 1 unit. This effective area modulates the amount of tunneling current that is delivered by each tip. More effective area from the conical tip also indicates that pitch (e.g., dimension M+P+S0 in FIGS. 2A and 2B or dimension S1 in FIG. 5) for patterning such arrays may be larger; hence, it should not be deduced from graph 300 that conical tips are favored to that of the pyramid shape due to their larger cross section. Conical tips may be favored, however, to pyramid tips for some sensing circuit designs as the maximum effective cross section is reached for a longer period of time, as indicated by the shapes of the tops of curves 301 and 302

Figure 4A:
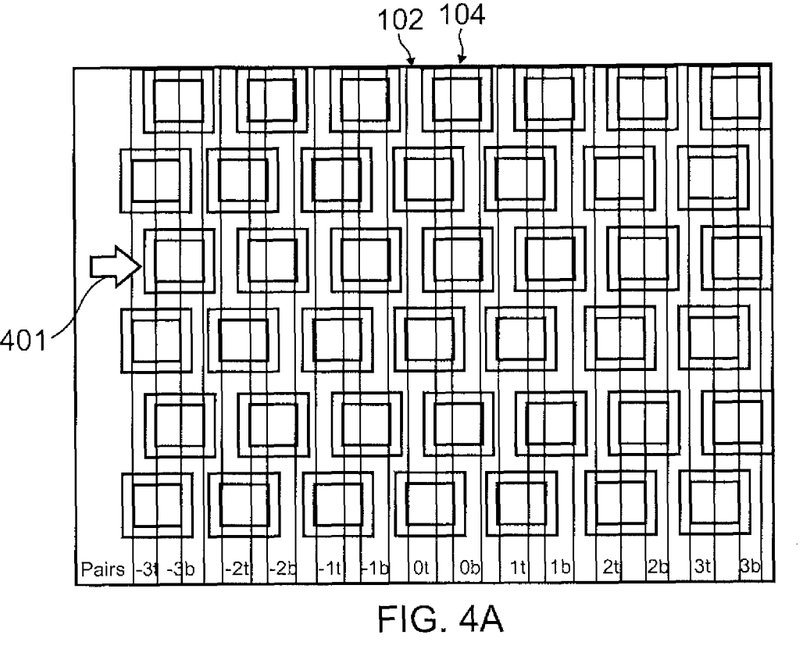
FIGS. 4A and 4B are plan view diagrams showing lateral displacement between top and bottom plates of a MEMS tunneling accelerometer, in accordance with an embodiment.
Figure 4B:
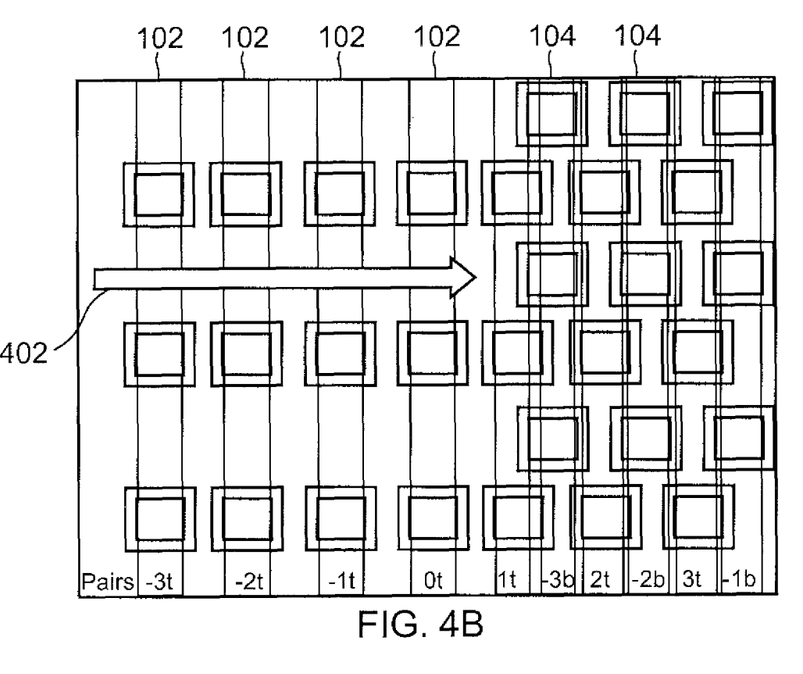

FIGS. 4A and 4B illustrate lateral displacements between top 102 and bottom 104 layers of a MEMS tunneling accelerometer 100, in accordance with an embodiment. FIG. 4A illustrates the relative tunneling tip displacement as a result of a lateral vibration indicated by arrow 401. FIG. 4B illustrates the relative tunneling tip displacement as a result of a larger lateral vibration indicated by arrow 402. Because there is no overlap, in FIG. 4B, for columns −3t through 0t, there is no tunneling current from these columns so that total tunneling current may be less by comparison to FIG. 4A where there is an overlap for columns −3t through 0t. Thus, it may be seen that detected current decreases from its maximum for stronger forces (e.g., vibration 402) and may be maximized for smaller vibrations (e.g., vibration 401). This may be explained by noting that effective area (e.g., overlap) between tip arrays of top 102 and bottom 104 layer tunneling tips and plates may be reduced as a result of larger displacement (corresponding to larger acceleration or vibration 402) as shown in FIG. 4B. The differential sensing thus provided can be used to minimize or suppress sensing of large forces as a result of undesired environmental effects.

Using the embodiments illustrated in FIGS. 1, 4A, and 4B may enable sensing a tunneling current between a first array of tunneling tips and plates (e.g., top layer 102) and a second array of tunneling tips and plates (e.g., bottom layer 104) that is greater for smaller displacements and decreases for larger displacements As an example, there is a great interest in the oil and gas industry in monitoring seismic activities of fractured wells that are typically 2,000 ft. to below 20,000 ft. in depth. Tunneling MEMS seismic sensors that can suppress very large seismic activities at the surface and shallow depths such that maximum sensitivity can be obtained for small signals propagated from the deep seismic activities may be useful to replace or enhance the use of current geophones used for monitoring the shallow wells that are, however, deficient mostly at the lower depths, typically below 7,000 ft.

Figure 5:
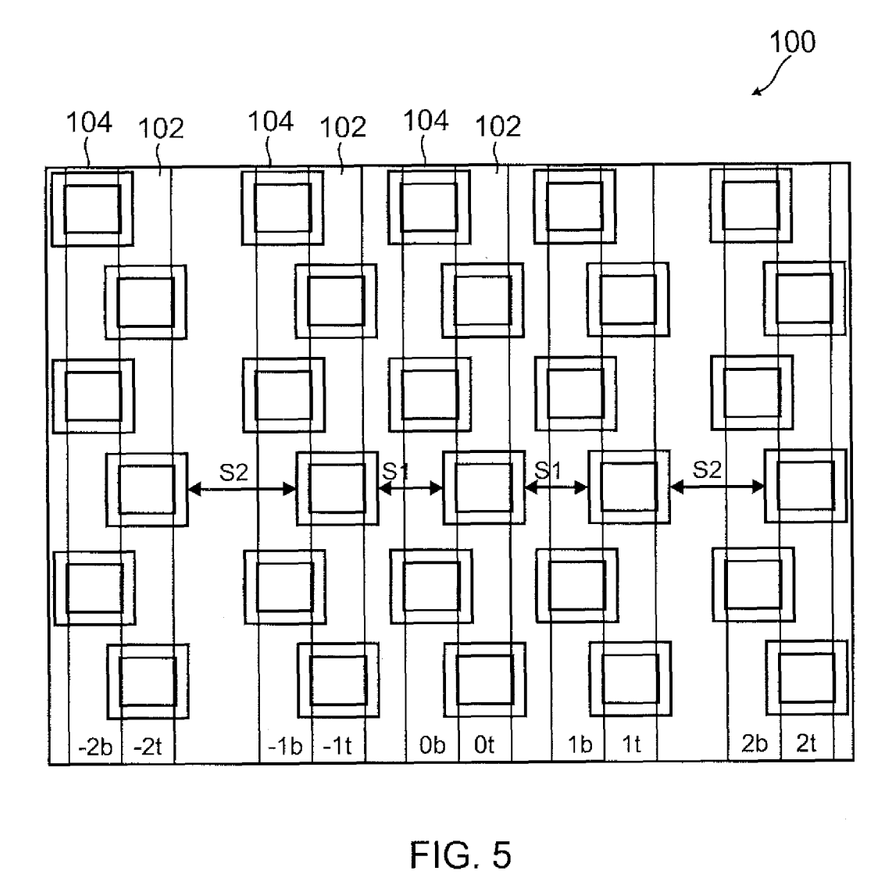
FIG. 5 is a plan view diagram showing varying separation between top and bottom plates of a MEMS tunneling accelerometer, in accordance with an embodiment.

FIG. 5 illustrates a MEMS tunneling accelerometer 100 with varying separation between top 102 and bottom 104 layers of tunneling tips and plates, in accordance with an alternative embodiment. The example accelerometer illustrated in FIG. 5 may provide maximum or greater sensitivity than the example shown in FIG. 4 for small seismic waves and may better suppress (than the example shown in FIG. 4) very large seismic activities that may occur at shallower depths. The separation of the top and bottom pair tips from the next column of top and bottom pair tips may be increased gradually to suppress the large seismic activities. Thus, the array of top 102 and bottom 104 layers may be configured with a sequence of lateral separations, S1, S2, . . . , as measured along a row, between successive columns of the top layer, as shown, (and so that there is the same spacing between corresponding successive columns of the bottom layer) such that the size of the lateral separations S1, S2, . . . , generally increases from column to column. In general, S1, S2, . . . Sn may be provided so that S1<S2< S3 . . . <Sn, but the sequence need not be strictly increasing.

Using the embodiment illustrated in FIG. 5, may enable sensing a tunneling current with a sensitivity that is enhanced over an array with constant spacing with greater sensitivity for small displacements and greater suppression for large displacements.

FIGS. 6A, 6B, 6C, 6D, 6E, 6F, and 6G are cross sectional diagrams illustrating various stages in a manufacturing process for a MEMS tunneling accelerometer 100, in accordance with an embodiment. Fabrication of a MEMS tunneling accelerometer 100 may be accomplished using a modified complementary metal oxide semiconductor (CMOS) process. Using a CMOS process may significantly reduce the cost of the MEMS sensor due to the simpler, hence, better yielding manufacturing process as well as lower cost as a result of volume production.

Figure 6A:
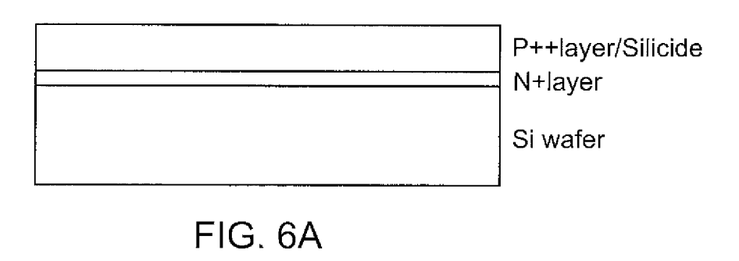
FIGS. 6A, 6B, 6C, 6D, 6E, 6F, and 6G are cross sectional diagrams illustrating various stages in a manufacturing process for a MEMS tunneling accelerometer, in accordance with an embodiment.
Figure 6B:
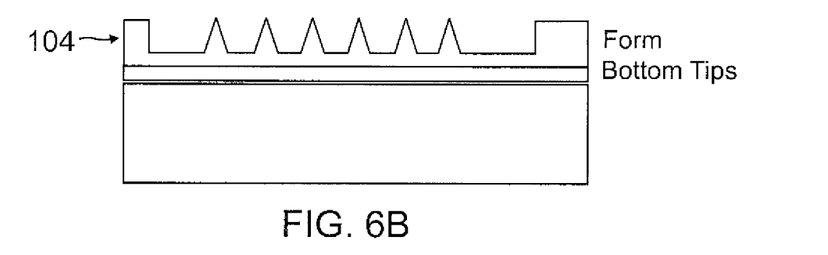
Figure 6C:
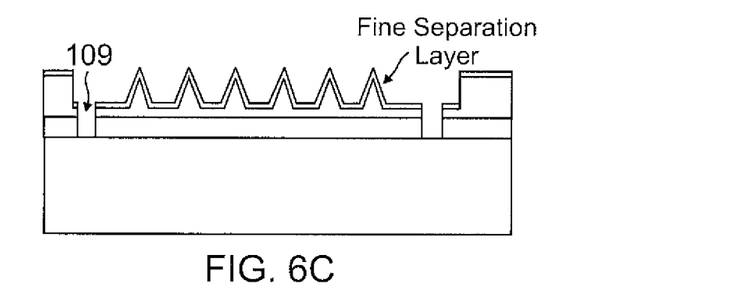
Figure 6D:
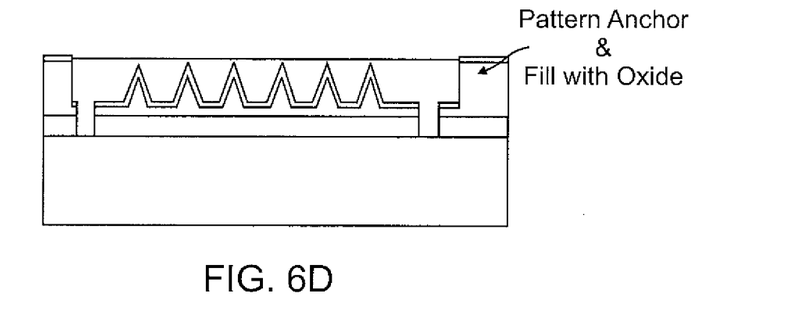
Figure 6E:
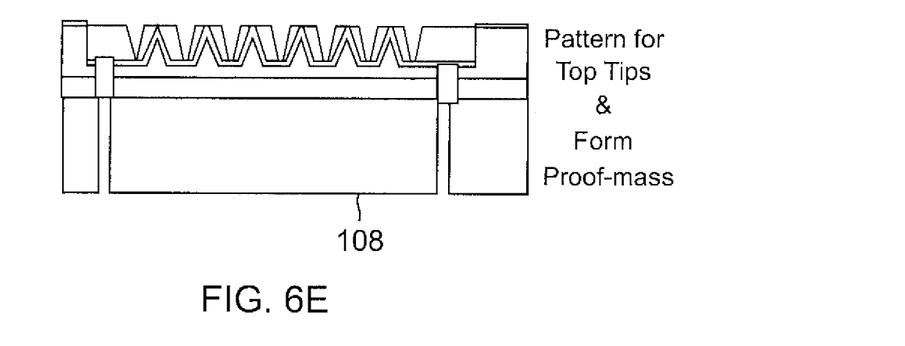
Figure 6F:
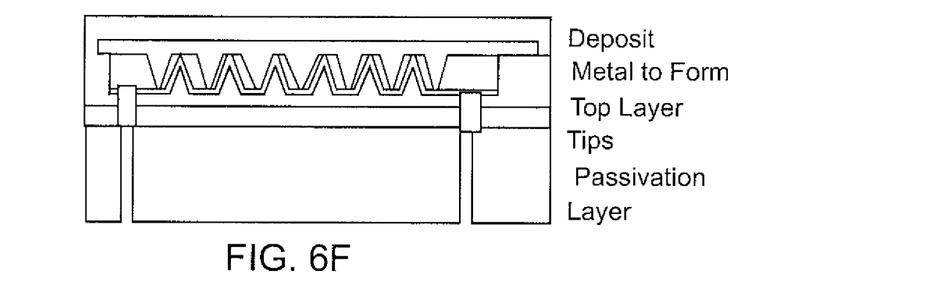
Figure 6G:
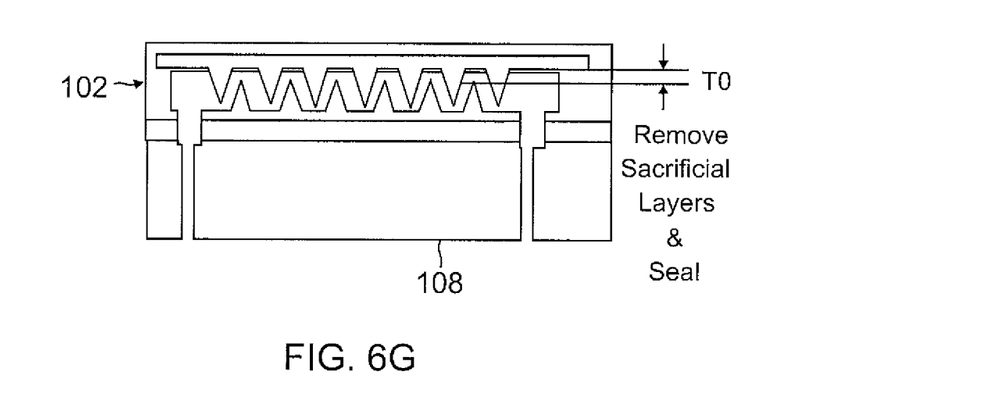

The process may include steps, for example, that result in the manufacture reaching various stages as shown in FIGS. 6A through 6G. As shown in FIG. 6A, during the manufacturing of the positive metal oxide semiconductor (PMOS), the composite layer of P++ on N+ deep junction (e.g., buried layer) may be formed. By proper combination of anisotropic—e.g., using reactive ion etching (RIE)—as well as isotropic etch, the bottom layer 104 tips are formed on the P++ layer as shown in FIG. 6B. As seen in FIG. 6C, a nitride or oxynitride passivation layer (fine separation layer) may be formed and patterned such that openings 109 for isolation of proof-mass 108 can be defined. The fine separation, passivation layer is a critical layer for defining the separation of the tips (e.g., bottom layer 104 tips) from corresponding injection plates (e.g., top layer 102 plates). An oxide layer may then be deposited as shown in FIG. 6D, with patterning for anchor 106, and the oxide layer may be etched back to stop at the previously deposited passivation (e.g., nitride) layer as shown in FIG. 6E. As seen in FIG. 6E, the gaps for all tunneling tips (top and bottom) may be formed, as well as the proof mass 108, by isotropic etching of the deposited oxide layer which ends at the nitride or oxynitride (passivation or fine separation) layer. As shown in FIG. 6F, an aluminum or silicide layer may then be deposited to fill the gaps and form the top layer tunneling tips. FIG. 6G illustrates that the combination of oxide (sacrificial layer) and nitride (passivation layer) may be removed chemically and the proof-mass 108 created.

The tunneling tips (e.g. bottom layer 104 and top layer 102 tunneling tips) may, thus, be formed in two separate plates in a single substrate. It should be noted that the additional steps in manufacturing the MEMS tunneling accelerometer sensor 100 can be integrated to a standard CMOS process, hence, providing further integration capability with associated signal processing circuits.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A tunneling accelerometer comprising:
a top layer of tunneling tips and plates connected to an anchor;
a bottom layer of tunneling tips and plates such that the tunneling tips align with the plates of the top layer and the plates align with the tunneling tips of the top layer in an absence of applied accelerations; and
a proof mass connected to the bottom layer of tunneling tips and plates and configured to allow displacement of the proof mass laterally relative to the anchor in a plane defined by the top and bottom layers in response to applied accelerations so that there is a corresponding lateral displacement between the tunneling tips of the bottom layer and the plates of the top layer as well as the plates of the bottom layer and the tunneling tips of the top layer.

2. The tunneling accelerometer of claim 1, wherein:
the top layer of tunneling tips and plates form a first array with the tunneling tips and plates arranged as columns and the tunneling tips spaced along each column and arranged in rows;
the bottom layer of tunneling tips and plates form a second array with the tunneling tips and plates arranged as columns and the tunneling tips spaced along each column and arranged in rows; and
the top and bottom layers are configured with a sequence of lateral separations, S1, S2, . . . , as measured along a row, between successive columns of the top layer, and between corresponding successive columns of the bottom layer, wherein a size of the lateral separations increases from column to column.

3. The tunneling accelerometer of claim 1, wherein:
the top layer of tunneling tips and plates form a first array with the tunneling tips and plates arranged as columns and the tunneling tips spaced along each column and arranged in rows;
the bottom layer of tunneling tips and plates form a second array with the tunneling tips and plates arranged as columns and the tunneling tips spaced along each column and arranged in rows; and
the top and bottom layers are configured with a lateral separation, S0, as measured along a row, between a column of the top layer and a column of the bottom layer.

4. The tunneling accelerometer of claim 1, wherein:
the top layer of tunneling tips and plates form a first array with the tunneling tips and plates arranged as columns and the tunneling tips spaced along each column and arranged in rows;
the bottom layer of tunneling tips and plates form a second array with the tunneling tips and plates arranged as columns and the tunneling tips spaced along each column and arranged in rows; and
the top and bottom layers are configured with a horizontal separation, S, as measured along a column, between a tip of the top layer and a tip of the bottom layer wherein tips of the top and bottom layers are laterally displaceable past each other in response to applied accelerations.

5. A method comprising:
aligning a top layer of tunneling tips and plates with a bottom layer of tunneling tips and plates such that the tunneling tips of the bottom layer align with the plates of the top layer and the plates of the bottom layer align with the tunneling tips of the top layer in an absence of applied accelerations, wherein the top layer is connected to an anchor and the bottom layer is connected to a proof mass;
displacing the proof mass laterally relative to the anchor in a plane defined by the top and bottom layers in response to an applied acceleration so that there is a corresponding lateral displacement between the tunneling tips of the bottom layer and the plates of the top layer as well as the plates of the bottom layer and the tunneling tips of the top layer; and sensing a tunneling current between the top layer of tunneling tips and plates and the bottom layer of tunneling tips and plates with a sensitivity that is greater for small displacements than for large displacements.

6. The method of claim 5, further comprising:

providing lateral separations, S1, S2, . . . , as measured along a row, between successive columns of the top layer, and between corresponding successive columns of the bottom layer, wherein a size of the lateral separations increases from column to column; and sensing the tunneling current with a sensitivity that is enhanced compared to a top layer and a bottom layer for which the size of the lateral separations is constant from column to column.

7. The tunneling accelerometer of claim 1, wherein:

the top layer of tunneling tips and plates forms a first array with the tunneling tips and plates arranged as columns and the tunneling tips spaced along each column and arranged in rows;

the bottom layer of tunneling tips and plates forms a second array with the tunneling tips and plates arranged as columns and the tunneling tips spaced along each column and arranged in rows; and the top and bottom layers are configured with a lateral separation, S0, as measured along a row, between a column of the top layer and a column of the bottom layer, wherein:

the tunneling tips of the top layer and the tunneling tips of the bottom layer are pyramid shaped;

the lateral separation, S0, is greater than or equal to zero; and a tunneling injection current is zero in an absence of the applied accelerations.

8. The tunneling accelerometer of claim 1, wherein:

the top layer of tunneling tips and plates forms a first array with the tunneling tips and plates arranged as columns and the tunneling tips spaced along each column and arranged in rows;

the bottom layer of tunneling tips and plates forms a second array with the tunneling tips and plates arranged as columns and the tunneling tips spaced along each column and arranged in rows; and the top and bottom layers are configured with a lateral separation, S0, as measured along a row, between a column of the plates of the top layer and a column of the plates of the bottom layer, wherein:

the tunneling tips of the top layer and the tunneling tips of the bottom layer are conical shaped;

the lateral separation, S0, is greater than zero; and a tunneling injection current is zero in an absence of the applied accelerations.

9. The tunneling accelerometer of claim 1, wherein the tunneling accelerometer is configured such that:

a maximum of a tunneling current occurs at a corresponding lateral displacement between the tunneling tips of the bottom layer and the plates of the top layer in an amount corresponding to a width of the plates of the top layer; and the tunneling current decreases from the maximum tunneling current for the corresponding lateral displacement between the tunneling tips of the bottom layer and the plates of the top layer in any amount greater than the width of the plates of the top layer.

10. The method of claim 5, further comprising:

providing a constant lateral separation, S0, as measured along a row, between successive columns of the top layer of tunneling tips and plates, and between corresponding successive columns of the bottom layer of tunneling tips and plates; and producing an effective area of overlap of the top layer of tunneling tips and plates and the bottom layer of tunneling tips and plates, the effective area of overlap having a maximum that occurs at a displacement of the of tunneling tips and plates laterally relative to the of tunneling tips and plates in an amount corresponding to a width of the plates of the top layer, and the effective area of overlap decreasing from the maximum at any displacement greater than the width of the plates of the top layer; and modulating an amount of the tunneling current according to the effective area of overlap of the top layer of tunneling tips and plates and the bottom layer of tunneling tips and plates.

11. The method of claim 5, further comprising:

sensing the tunneling current using conical shaped tunneling tips.

12. The method of claim 5, further comprising:

sensing the tunneling current using pyramid shaped tunneling tips.

13. The method of claim 5, further comprising:

providing lateral separations, S1, S2, . . . , as measured along a row, between successive columns of the first array, and between corresponding successive columns of the second array, wherein a size of each lateral separation is greater than or equal to zero; and wherein the size of the lateral separations is either constant or increases from column to column.

* * * * *